United States Patent
Edwards (10) Patent No.: US 7,708,175 B2
(45) Date of Patent: May 4, 2010

(54) VEHICULAR TOOL RESTRAINT APPARATUS

(75) Inventor: David Michael Edwards, Marysville, OH (US)

(73) Assignee: Honda Motor Company, Ltd., Tokyo (JP)

( * ) Notice: Subject to any disclaimer, the term of this patent is extended or adjusted under 35 U.S.C. 154(b) by 844 days.

(21) Appl. No.: 10/894,687

(22) Filed: Jul. 20, 2004

(65) Prior Publication Data

US 2006/0016839 A1 Jan. 26, 2006

(51) Int. Cl.
*B62D 43/00* (2006.01)
*B60R 11/06* (2006.01)

(52) U.S. Cl. .................... 224/42.14; 224/42.24
(58) Field of Classification Search ............. 224/42.13, 224/42.14, 42.24, 219, 221, 250, 568, 572; 296/37.2; 206/372, 373
See application file for complete search history.

(56) References Cited

U.S. PATENT DOCUMENTS

| | | | | |
|---|---|---|---|---|
| 1,008,680 A | * | 11/1911 | Temple | 224/42.14 |
| 1,573,239 A | * | 2/1926 | Gilliland | 220/212 |
| 2,302,300 A | * | 11/1942 | Davies | 224/559 |
| 4,241,833 A | * | 12/1980 | Luebcke | 206/570 |
| 4,498,614 A | | 2/1985 | Guarr | |
| 4,880,152 A | * | 11/1989 | Trankle | 224/162 |
| 4,917,279 A | * | 4/1990 | Brow et al. | 224/42.14 |
| 5,118,017 A | | 6/1992 | Buck | |
| 5,228,608 A | | 7/1993 | Stout, III | |
| 5,429,285 A | | 7/1995 | Kim | |
| 5,586,698 A | | 12/1996 | Satoh | |
| 6,026,999 A | | 2/2000 | Wakefield | |
| 6,038,984 A | | 3/2000 | Freitag | |
| 6,336,671 B1 | | 1/2002 | Leonardi | |
| 6,467,829 B2 | | 10/2002 | Kaluszka et al. | |
| 7,036,697 B2 | * | 5/2006 | Hwang et al. | 224/42.14 |
| 2001/0035443 A1 | * | 11/2001 | Jones et al. | 224/222 |

FOREIGN PATENT DOCUMENTS

JP 2001146137 A * 5/2001

* cited by examiner

*Primary Examiner*—Nathan J Newhouse
*Assistant Examiner*—Justin M Larson
(74) *Attorney, Agent, or Firm*—Ulmer & Berne LLP (57) ABSTRACT

An apparatus is provided for securing tools with respect to a spare wheel for a vehicle. The apparatus includes a hub member that is adapted for selective securement to a central area of a spare wheel. At least one securement structure is provided on the hub member. At least one strap member is secured to the at least one securement structure. The at least one strap member is adjustable to at least partially define a variably sized opening and is configured to selectively secure at least one tool within the variably sized opening.

30 Claims, 6 Drawing Sheets

VEHICULAR TOOL RESTRAINT APPARATUS

TECHNICAL FIELD

The present invention relates to an apparatus for securing tools with respect to a spare wheel for a vehicle. The apparatus includes a hub member and at least one strap member secured to the hub member. The strap member(s) can be selectively adjustable to at least partially define a variably sized opening in which one or more tools can be secured.

BACKGROUND OF THE INVENTION

It is typical for some wheeled vehicles, such as automobiles and trucks, to be provided with one or more tools. These tools can be used by an operator to remedy any of a variety of vehicular problems including but not limited to the removal of a defective wheel (e.g., having a flat tire) and the installation of a spare wheel. In particular, such tools might include a jack, a pry bar, a wrench, and a screwdriver.

Effectively storing these tools in a vehicle can be difficult. In particular, unless the tools are restrained, they might move during vehicular travel, and may accordingly damage adjacent items, create annoying sounds, and/or become so displaced that they are no longer readily locatable or accessible to an operator. However, as such tools are typically not needed by an operator on a frequent basis, vehicular manufacturers might not wish to employ sophisticated, bulky, and/or expensive restraint arrangements. Accordingly, there is a need for a simple but effective tool storage apparatus that can selectively restrain one or more tools such that they are conveniently accessible to an operator.

SUMMARY OF THE INVENTION

It is an aspect of the present invention to provide a simple but effective tool storage apparatus that can selectively restrain one or more tools such that they are conveniently accessible to an operator. To achieve the foregoing and other aspects, and in accordance with the purposes of the present invention defined herein, apparatuses are provided herein for securing tools with respect to a spare wheel for a vehicle.

In accordance with one exemplary embodiment of the present invention, an apparatus is provided for securing tools with respect to a spare wheel for a vehicle. The apparatus comprises a hub member that is adapted for selective securement to a central area of a spare wheel. At least one securement structure is provided on the hub member. At least one strap member is secured to the at least one securement structure. The at least one strap member is adjustable to at least partially define a variably sized opening. Also, the at least one strap member is configured to selectively secure at least one tool within the variably sized opening.

In accordance with another exemplary embodiment of the present invention, an apparatus for securing tools with respect to a spare wheel for a vehicle is provided in combination with the spare wheel. The apparatus comprises a hub member that is adapted for selective securement to a central area of the spare wheel. At least one securement structure is provided on the hub member. At least one tool is provided. At least one strap member is secured to the at least one securement member. The at least one strap member is adjustable to at least partially define a variably sized opening. Also, the at least one strap member is configured to selectively secure the at least one tool within the variably sized opening.

In accordance with yet another exemplary embodiment of the present invention, an apparatus is provided for securing tools with respect to a spare wheel for a vehicle. The apparatus comprises a hub member that is adapted for selective association with a central area of a spare wheel. A first belt has a first end and a second end. The first end of the first belt is secured to the hub member at a first location. A second belt has a first end and a second end. The first end of the second belt is secured to the hub member at a second location. The first and second belts are adjustable to at least partially define a variably sized opening in which at least one tool can be compressingly engaged. The second end of the first belt is configured for selective interconnection with the second end of the second belt such that at least one tool can be selectively secured within the variably sized opening.

One advantage of the present invention is its provision of a simple but effective tool storage apparatus that can selectively restrain one or more tools such that they are conveniently accessible to an operator. Additional aspects, advantages and novel features of the invention will be set forth in part in the description that follows and in part will become apparent to those skilled in the art upon examination of the following or may be learned with the practice of the invention. The aspects and advantages of the invention may be realized and attained by means of the instrumentalities and combinations particularly pointed out in the appended claims.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF EXEMPLARY EMBODIMENTS

Figure 1:
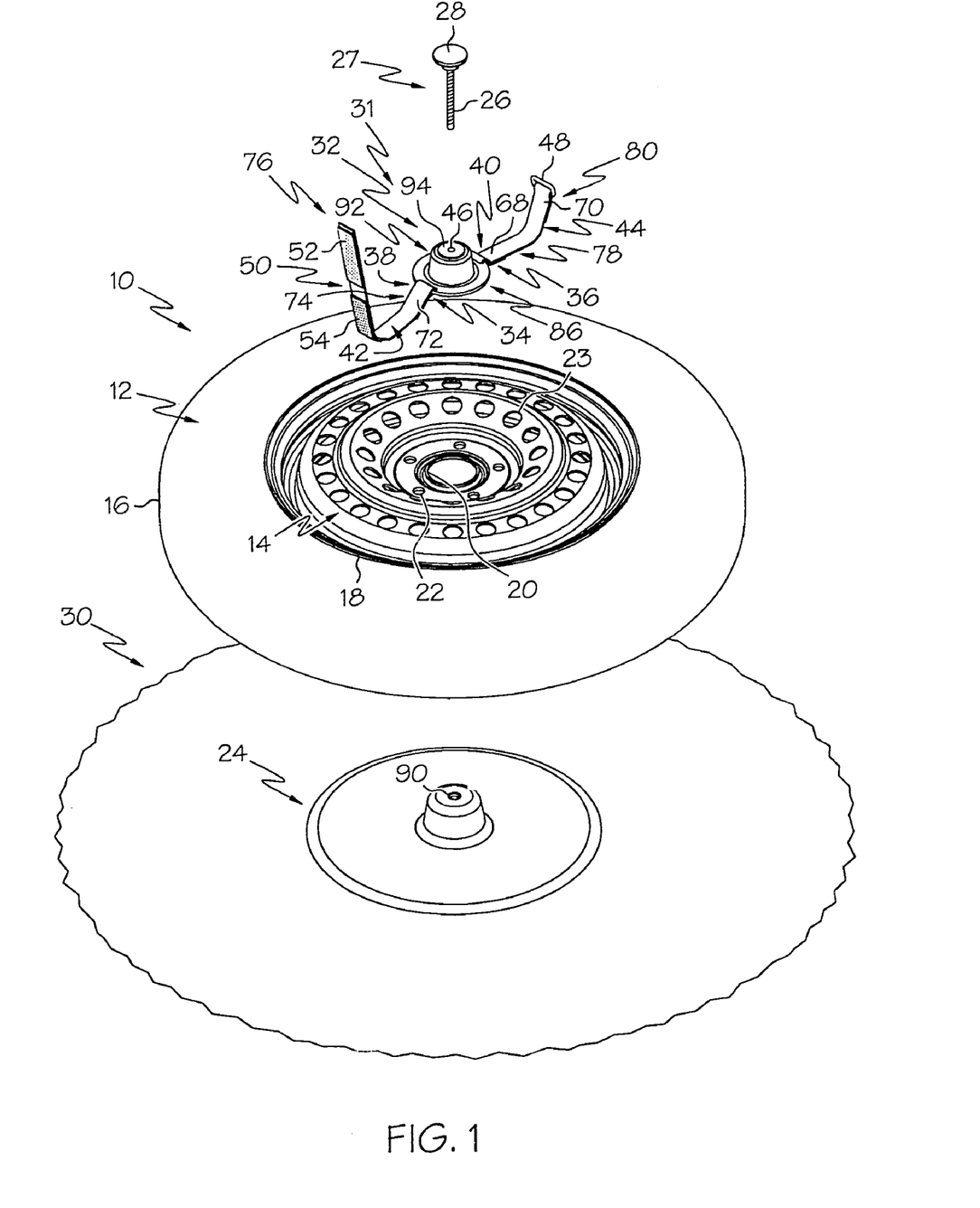
FIG. 1 is a perspective view depicting a restraint apparatus in accordance with one exemplary embodiment of the present invention, wherein the restraint apparatus is shown with respect to a spare wheel, a bolt and a vehicular mounting base.

The present invention and its operation are hereinafter described in detail in connection with the views and examples of FIGS. 1-6, wherein like numbers indicate the same or corresponding elements throughout the views. Referring to FIG. 1, a spare wheel 10 is shown to include a peripheral area 12 and a central area 14. The peripheral area 12 is shown to be provided by a tire 16, which can either be solid or air-filled. The central area 14 is shown to include a rim 18 that can have multiple openings such as a central opening 20 for receiving a vehicle's hub, as well as one or more non-central openings. Some non-central openings (e.g., 22) can be configured to receive lug bolts for mounting the wheel 10 to a vehicle's hub, while other non-central openings (e.g., 23) might be provided within the rim 18 for aesthetic, structural or other reasons.

FIG. 1 also depicts a mounting base 24 that is provided by a vehicle 30. The mounting base 24 provides a suitable location against which a vehicle's spare wheel 10 can be secured. The mounting base 24 can either be immovable with respect to the associated vehicle 30 (e.g., integral with the vehicle's unibody or frame), or moveable with respect to the associated vehicle 30 (e.g., as part of a sliding tray). Regardless of whether the mounting base 24 is moveable or immovable, it can be located in any of a variety of suitable locations upon a vehicle, and can assume any of a variety of specific configurations. For example, the mounting base 24 might be disposed beneath the floor of a vehicle's trunk (e.g., in a subjacent storage compartment) or might alternatively be disposed upon a vehicle's side wall or tailgate. In some embodiments such as that depicted in FIG. 1, a threaded aperture 90 can be provided by the mounting base 24. The spare wheel 10 can be positioned with respect to the mounting base 24 so that one of its apertures (e.g., 20, 22, 23) substantially aligns with the threaded aperture 90.

Figure 2:
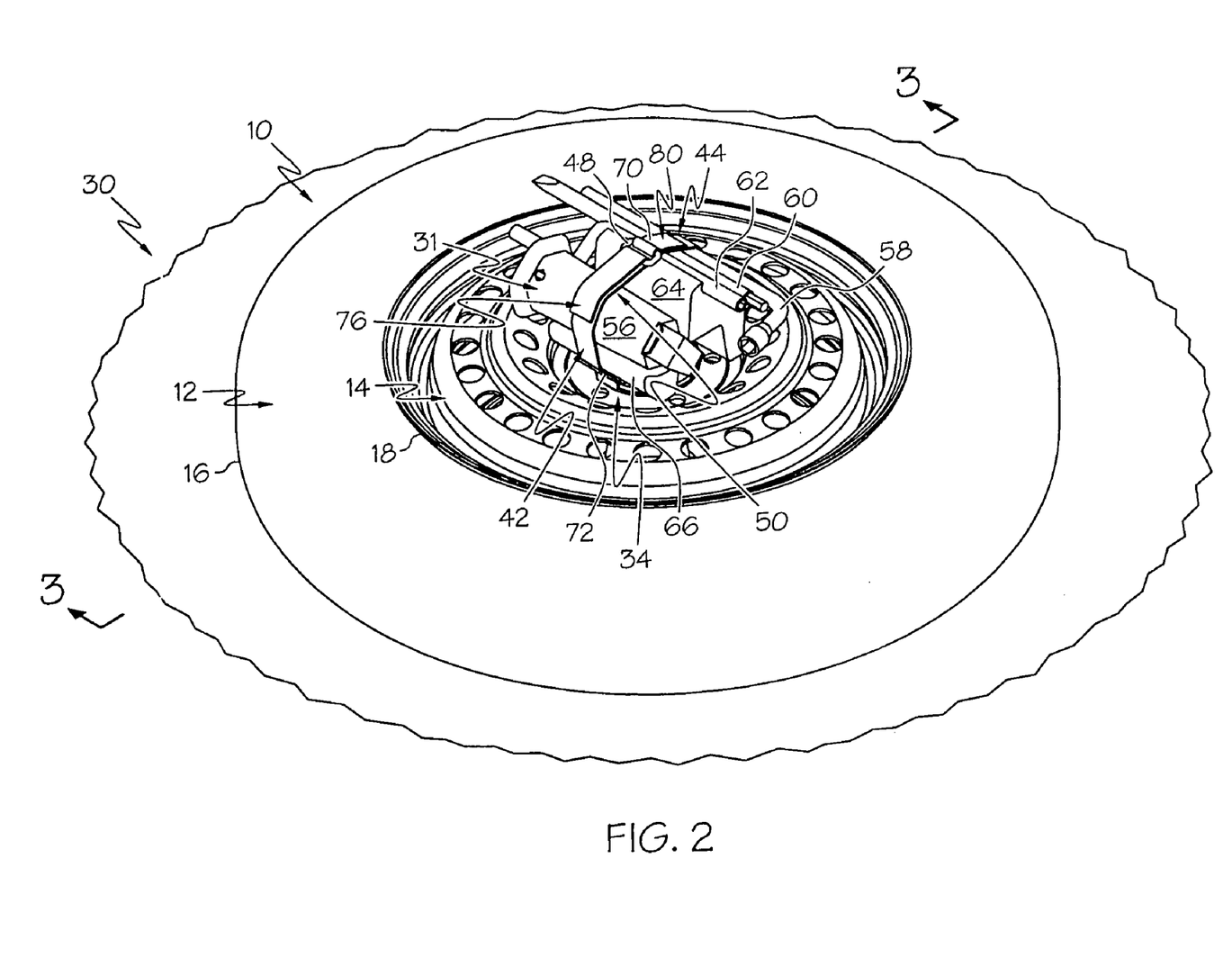
FIG. 2 is a perspective view depicting the restraint apparatus of claim 1 in use to secure tools with respect to a vehicle's spare wheel.
Figure 3:
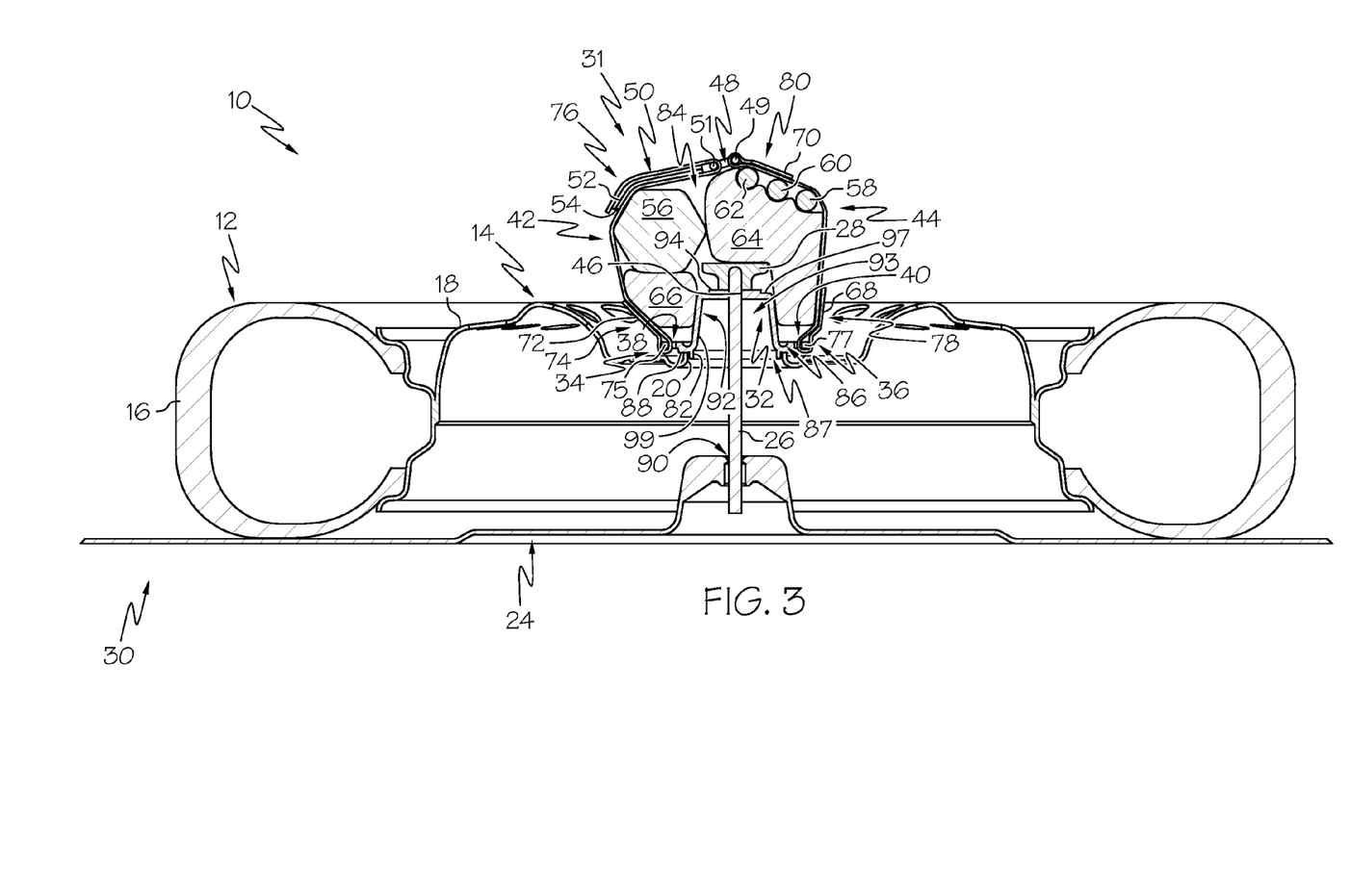
FIG. 3 is a cross-sectional view of the restraint apparatus, tools, bolt, spare wheel and vehicular mounting base of FIG. 3 taken along lines 3-3 in FIG. 2.

A restraint apparatus 31 in accordance with the teachings of the present invention can then be positioned adjacent to the spare wheel 10. In one embodiment (e.g., as shown in FIGS. 1-3), the restraint apparatus 31 can be positioned such that an aperture 46 in the restraint apparatus 31 substantially aligns with one of the openings in the spare wheel 10 (e.g., central opening 20, or a non-central opening 22 or 23) and with the threaded aperture 90 in the mounting base 24. A bolt 27 having a threaded portion 26 and a bolt head 28 can then be oriented such that its threaded portion 26 is inserted through the aligned aperture 46, the opening 20, and the threaded aperture 90 in the mounting base 24. When tightened, the bolt head 28 can bear upon the restraint apparatus 31, and the restraint apparatus 31 can in turn bear against the spare wheel 10, such that both the restraint apparatus 31 and the spare wheel 10 are secured in a fixed position with respect to the mounting base 24. To remove the spare wheel 10 and the restraint apparatus 31 from this association with the mounting base 24, the bolt 27 need only be unscrewed from the threaded aperture 90. In some embodiments a washer might be provided between the bolt head 28 and the top surface 94 of the restraint apparatus 31.

The restraint apparatus 31 can be configured to retain one or more tools with respect to the spare wheel 10. Such tools might include any of a variety of tools that might be used to facilitate the removal or installation of a vehicular tire, the raising/lowering of the vehicle, and/or other maintenance or repair to the vehicle. In particular, such tools might include one or more jacks (e.g., piston-type, screw-type, or scissor-type), jack handles, wrenches, pry bars, fire extinguishers, first aid kits, flashlights, radios, flares, reflector units, tire pumps, screwdrivers, hammers, pliers, spare parts kits (e.g., having fuses, light bulbs, etc.), fuel siphons, towels, tow straps, jumper cables, tie-downs, and/or any of a variety of other tools. In one specific embodiment, the tools secured by the restraint apparatus 31 can comprise at least one of a jack, a lug wrench, a jack handle, and a pry bar. By securing tools with respect to a stored spare vehicular wheel, the tools can be restrained from movement during vehicular travel such that they can be easily located by an operator when needed, and so that they will not cause noise or damage while stored during vehicular movement.

One exemplary restraint apparatus 31 in accordance with the teachings of the present invention is depicted in FIGS. 1-3. This restraint apparatus 31 is shown to include a hub member 32 having a base portion 86 and a pedestal portion 92 that extends away from base portion 86. As shown in FIG. 3, base portion 86 includes an aperture 87 that communicates with aperture 46 in pedestal portion 92. As shown in FIG. 3, pedestal portion 92 can have a hollow interior 93 that communicates with aperture 46 in pedestal portion 92 and aperture 87 in base portion 86. Base portion 86 can be annular as shown in FIG. 3. The pedestal portion 92 can include a distal wall 97, which can be a top wall as shown in FIG. 3, that includes the top surface 94 against which a bolt head (e.g., 28) can contact and bear upon (as previously discussed). In other embodiments (e.g. the subsequently discussed embodiment shown in FIG. 6), restraint apparatus can be provided that are associated with respective spare wheels in an inverted orientation such that a distal wall of an included pedestal portion of each inverted restraint apparatus is a bottom wall. The pedestal portion 92 can also include a side wall 99 that can separate the distal wall 97 from the base portion 86. The base portion 86 includes a bottom surface 88 that can contact the central area 14 of the spare wheel 10 and/or can interact with one or more openings in the central area 14 of the spare wheel 10 (e.g., when the hub member 32 is tightened against the rim 18 by bolt head 28). The base portion 86 might also include a lip 82 that is sized and configured to matingly interface with an opening (e.g., central opening 20) in the central area 14 of the spare wheel 10, as shown for example in FIG. 3. Through use of this lip 82, the base portion 86 can snugly interface the central opening 20 of the rim 18. In the event that the spare wheel 10 is alternatively oriented such that the threaded portion 26 extends through a non-central opening (e.g., 22 or 23) of the rim 18, a restraint apparatus 31 in accordance with the teachings of the present invention might alternatively be configured (e.g., with a base and/or lip) to matingly interface such a non-central opening. In this manner, the hub member 32 can be adapted for selective securement to a central opening 20 or another opening (e.g., 22 or 23) in the central area 14 of a spare wheel 10.

The restraint apparatus 31 depicted in FIGS. 1-3 is shown to include first and second securement structures 34, 36. The first and second securement structures 34, 36 are shown to be integrally formed with the hub member 32 and are shown as being provided directly on the hub member 32. However, it should be appreciated that the first and second securement structures 34, 36 might alternatively be provided separately from the hub member 32, but attached to the hub member 32 through use of fasteners, adhesives, and/or any of a variety of other connection techniques. It should be understood, however, that the first and second securement structures can assume any of a variety of specific configurations that can vary based upon the precise configuration of the hub member and of the strap members to be secured thereto.

In the embodiment depicted in FIGS. 1-3, the first securement structure 34 provides a first location 38 at which a first end 74 of a first strap member 42 can be secured. Likewise, the second securement structure 36 provides a second location 40 at which a first end 78 of a second strap member 44 can be secured. In some embodiments, the first location 38 can be spaced from the second location 40, as shown for example in the embodiment of FIGS. 1-3. Suitable strap members can comprise any of a variety of known materials including belts, chains, straps, bungee cords, cables, and/or any of a variety of other sufficiently flexible items. However, in the examples depicted in FIGS. 1-4, the strap members are shown to comprise belts formed from fabric (e.g., nylon) webbing.

Referring again to the restraint apparatus 31 depicted in FIGS. 1-3, the first end 74 of the first strap member 42 is shown to be secured to the first securement structure 34. In particular, the first end 74 is shown to partially wrap around a portion 75 of the first securement structure 34 and to then attach to itself (e.g., at a connection location 72) to maintain this wrapped securement. Connection location 72 might involve sewing, riveting, gluing, welding, and/or any of a variety of other connection techniques. A hook and loop fastener arrangement 50 is shown to be attached to the first strap member 42 adjacent to the second end 76 of the first strap member 42. The hook and loop fastener arrangement 50 is shown to include a hook portion 52 and a loop portion 54, whereby the first strap member 42 can be bent such that the hook portion 52 can selectively contact and engage the loop portion 54 (e.g., as shown in FIGS. 2-3). It should be appreciated that in alternative embodiments of the present invention, the hook portion 52 and loop portion 54 might be reversed, and/or the hook and loop arrangement 50 might be replaced by some other fastening system adjacent to the second end 76 of the first strap member 42.

The first end 78 of the second strap member 44 is shown to be secured to the second securement structure 36. In particular, the first end 78 is shown to partially wrap around a portion 77 of the second securement structure 36 and to then attach to itself (e.g., at connection location 68) to maintain this wrapped securement. The second end 80 of the second strap member 44 is shown to be fastened with a connector 48. In particular, the second end 80 is shown to partially wrap around a portion 49 of the connector 48 and to then attach to itself (e.g., at connection location 70) to maintain this wrapped fastening. Connection locations 68 and 70 might involve sewing, riveting, gluing, welding, and/or any of a variety of other connection techniques.

In use, one or more tools and/or spacers can then be held atop the hub member 32 while the strap members 42 and 44 are adjusted to at least partially define the variably sized opening 84 in which the tools and spacers are secured. To adjust the strap members 42 and 44, the second end 76 of the first strap member 42 can be wrapped at least partially around a portion 51 of the connector 48 and can then be adjusted (e.g., pulled tight) so that the variably sized opening 84 constricts to secure the tools and/or spacers within the variably sized opening 84. Once the variably sized opening 84 has been appropriately sized, a portion of the first strap member 42 that is associated with the hook portion 52 can then be pressed against a portion of the first strap member 42 that is associated with the loop portion 54, such that the hook portion 52 engages the loop portion 54. In this manner, the connector 48 selectively interconnects the second ends 76, 80 of the first and second strap members 42, 44, and the hook and loop fasteners are configured to assist in facilitating securement by the strap members 42, 44 of at least one tool within the variably sized opening 84.

With the hook and loop fastener arrangement 50 engaged as discussed above, the first and second strap members 42 and 44 can maintain tools and/or spacers in a secured position within the variably sized opening 84 until such time as an operator later decides to access the tools. When the operator wishes to remove restrained tools from the variably sized opening 84, an operator need only disengage the hook portion 52 from the loop portion 54, and then allow the strap members 42, 44 to loosen such that the variably sized opening 84 sufficiently enlarges so as to free the tools.

The first and second strap members 42 and 44 are accordingly adjustable such that they can cooperate with the hub member 32 to define the variably sized opening 84, and the strap members 42 and 44 are configured to adjust the size of the variably sized opening 84 to compressingly engage at least one tool therein. For example, as shown in FIGS. 2-3, such tools can include a jack 56, a wrench 58, and bars 60 and 62. Bars 60 and 62 might for example comprise handle extensions for the jack 56, and/or might comprise pry bars and/or other tools. Spacers 64 and 66 can be provided to separate the tools from contacting each other and from accordingly causing vibrations and/or other noise. Spacers can for example be formed from Styrofoam, wood, plastic, rubber and/or any other suitable material. Accordingly, the variably sized opening 84 can be suitable to receive any of a variety of tools in any of a variety of specific configurations, and the strap members 42, 44 can be used to secure those tools with respect to the hub member 32 and with respect to the mounting base 24 of the vehicle 30.

Figure 4:
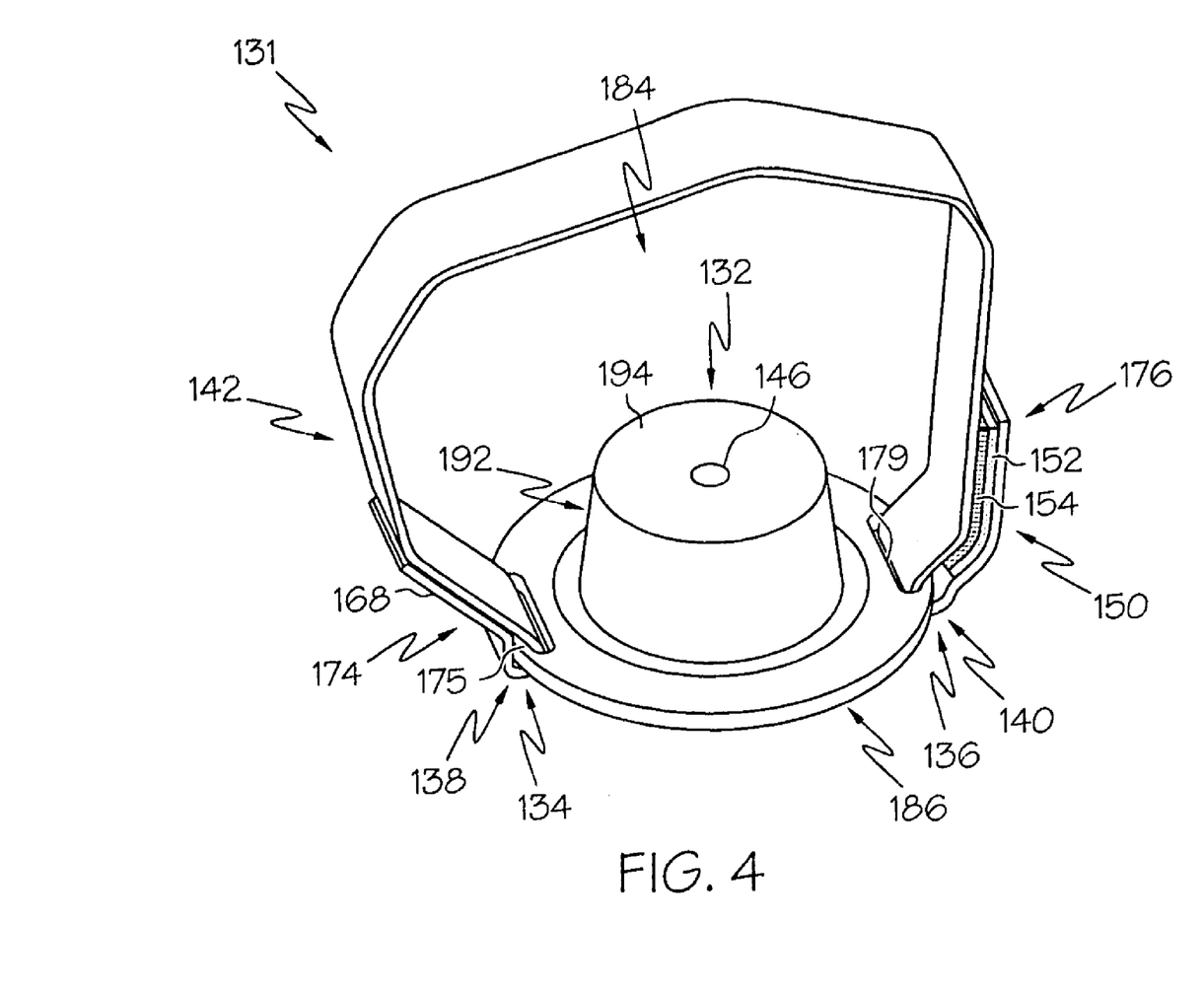
FIG. 4 is a perspective view depicting a restraint apparatus in accordance with another exemplary embodiment of the present invention.

Turning now to FIG. 4, another embodiment of a securing apparatus 131 in accordance with the teachings of the present invention is depicted. The securing apparatus 131 is shown to include a hub member 132 having a pedestal portion 192 and a base portion 186. The pedestal portion 192 is shown to include an aperture 146 for receiving a bolt for connection to a mounting base of a vehicle. The pedestal portion 192 is also shown to include a top surface 194 against which a securing bolt head can bear down. The base portion 186 can be configured to interface one or more openings in the central area of a spare wheel, and might include a lip or other structure to matingly interface a wheel rim.

First and second securement structures 134, 136 are shown to be associated or integral with the base portion 186 of the hub member 132. A first strap member 142 is shown to have a first end 174 that is secured to the first securement structure 134 at a first location 138. In particular, the first end 174 is shown to partially wrap around a portion 175 of the first securement structure 134 and to then reattach to itself (e.g., at a connection location 168) to maintain this wrapped securement. The first strap member 142 is shown to comprise a belt formed from fabric (e.g., nylon), although it should be appreciated that the first strap member 142 can alternatively be formed differently and/or from any of a variety of other suitable materials (as discussed above with respect to strap members 42 and 44).

After at least partially wrapping around any tools to be secured with respect to the spare wheel, the second end 176 of the strap member 142 can be secured to the second securement structure 136. In particular, the second end 176 can pass through an opening 179 in the second securement structure 136 and can then be adjusted (e.g., pulled tight) to restrict a variably sized opening 184 provided between the strap member 142 and the hub member 132. The second end 176 can then be attached to the strap member 142 adjacent to the second end 176 (e.g., through use of a hook and loop fastener arrangement 150 having a hook portion 152 associated with the second end 176 and a loop portion 154 associated with the strap member 142 in a location adjacent to the second end 176). In this manner, the second end 176 of the strap member 142 can be selectively interconnected with the second securement structure 136 at a second location 140, thereby providing an adjustable variably sized opening 184 for receiving and retaining tools.

It should be appreciated that a bolt need not be provided to maintain a support apparatus in close association with a spare wheel. For example, as shown in FIG. 5, a mounting base 224 of a vehicle 230 is depicted as including a threaded rod 226.

A spare wheel 210 having a central opening 220 can be positioned such that the central opening 220 passes over the threaded rod 226. A restraint apparatus 231 in accordance with the teaching of the present invention can have a hub member 232 that includes an aperture 246. The hub member 232 can be situated such that this aperture 246 passes over the threaded rod 226. A nut 228 or another securing device can then engage the end of the threaded rod 226, and can bear against a top surface 294 of the hub member 232 in order to hold the hub member 232 and the spare wheel 210 against the mounting base 224.

Tools or other implements may then be secured with respect to the hub member 232 through use of one or more strap members. For example, as shown in FIG. 5, first and second strap members 242 and 244 can have first ends 274 and 278 that are attached to the hub member 232 at first and second securement structures 234 and 236, respectively. The second ends 276 and 280 of the first and second strap members 242 and 244 can then attach together through use of a connector 248 and a hook and loop fastener arrangement 250, for example.

Figure 5:
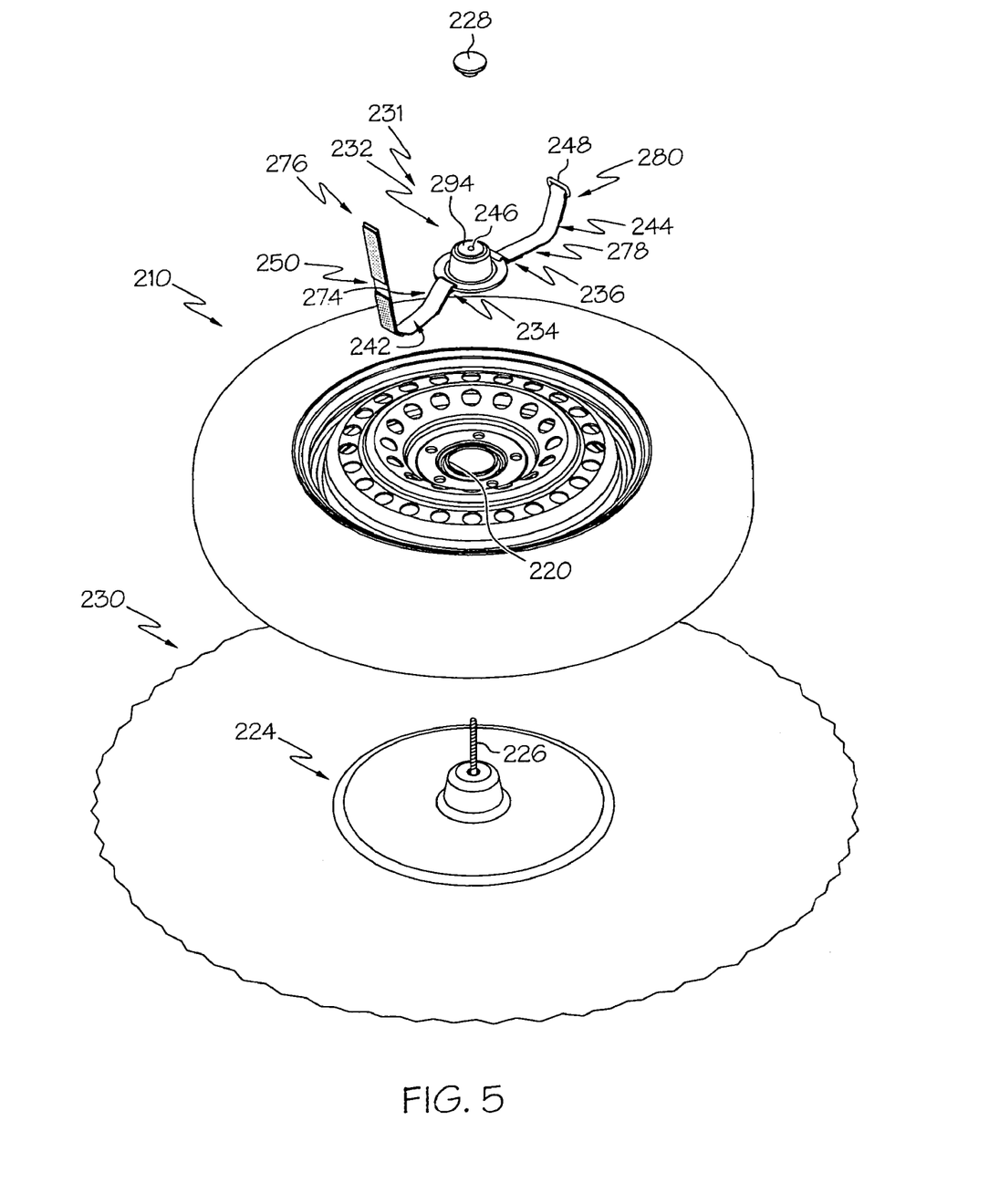
FIG. 5 is a perspective view depicting a restraint apparatus in accordance with another exemplary embodiment of the present invention, wherein the restraint apparatus is shown with respect to a spare wheel, a nut and a vehicular mounting base.

Although the threaded rod 226 is depicted in FIG. 5 as being vertically oriented, it should be appreciated that alternative mounting bases might be provided in which an associated threaded rod is substantially horizontally oriented. In another embodiment, a restraint apparatus in accordance with the present invention might itself incorporate a threaded aperture for engaging the threaded rod 226, and might accordingly itself operate to secure both itself and the spare wheel 210 with respect to the mounting base 224 of the vehicle 230. It should also be appreciated that other fasteners or interface devices might additionally or alternatively be provided to associate a restraint apparatus with a spare wheel in accordance with the present invention.

Figure 6:
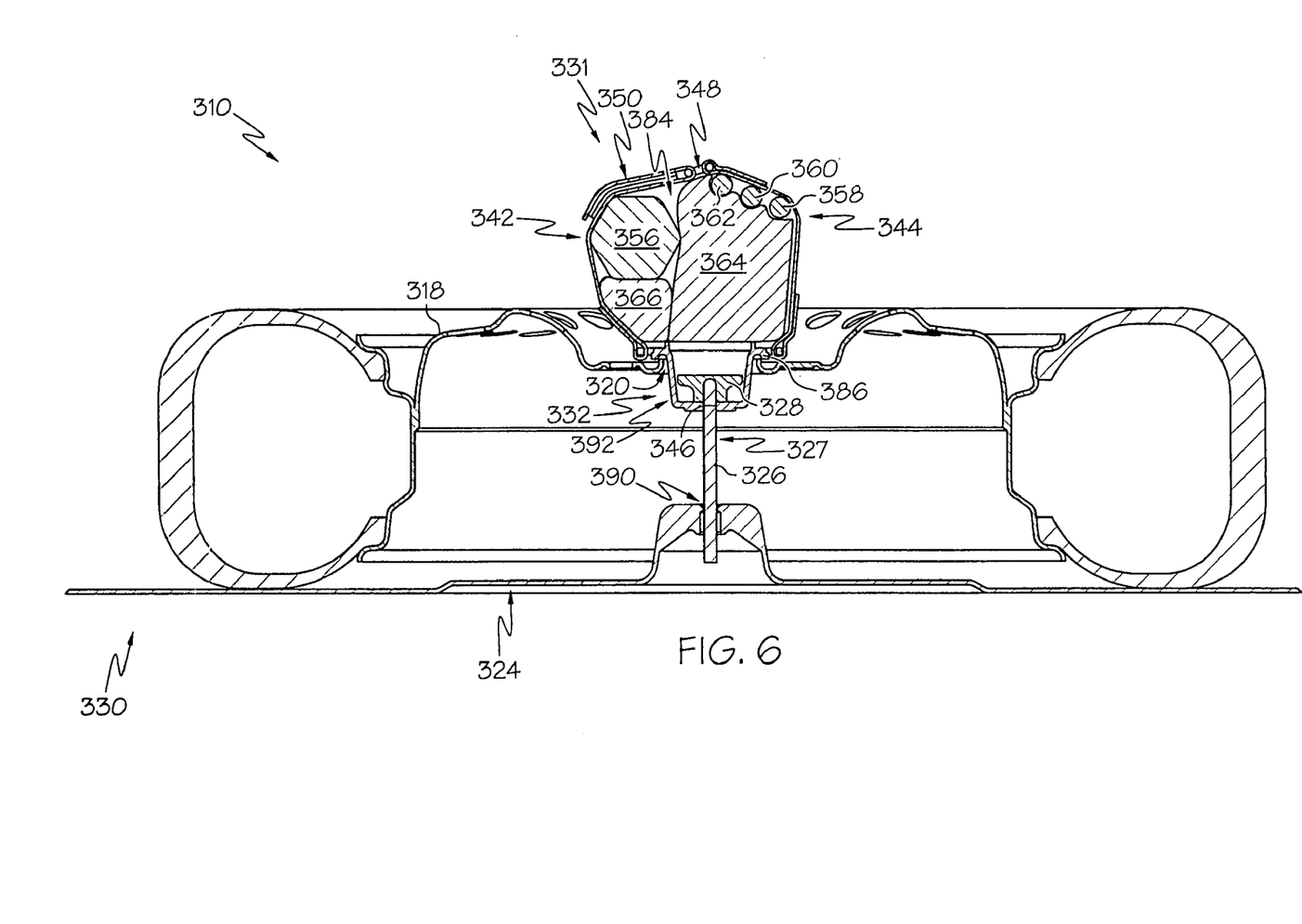
FIG. 6 is a cross-sectional view depicting a restraint apparatus in accordance with yet another exemplary embodiment of the present invention, wherein the restraint apparatus is shown with respect to a spare wheel, a bolt and a vehicular mounting base.

A restraint apparatus in accordance with the teachings of the present invention can have any of a variety of different configurations, and can be associated with a spare wheel in any of a variety of specific manners or orientations. For example, a restraint apparatus 331 is shown in FIG. 6 to be similar to the restraint apparatus 31 of FIGS. 1-3, except that restraint apparatus 331 is shown to be associated with a spare wheel 310 in an inverted orientation as compared to the restraint apparatus 31 of FIGS. 1-3. This inverted orientation may be desirable when, for example, clearance space above a spare wheel is limited, when the spare wheel 310 is a full-size spare wheel (shown in FIG. 6) as opposed to the temporary-use spare wheel 10 (shown in FIGS. 1-3), and/or when a larger variably sized opening 384 is desired (e.g., for storage of larger and/or additional tools).

The restraint apparatus of FIG. 6 is shown to include a hub member 332 and first and second strap members 342 and 344 attached to the hub member 332. The hub member 332 has a pedestal portion 392 and a base portion 386. The pedestal portion 392 can be inserted through a central opening 320 in the spare wheel 310, and the base portion 386 of the hub member 332 can then engage the rim 318 of the spare wheel 310 adjacent to the central opening 320, as shown in FIG. 6. A threaded portion 326 of a bolt 327 can then be inserted through an opening 346 in the pedestal portion 392, and can then be inserted into a threaded aperture 390 provided by a mounting base 324 of a vehicle 330. As the bolt 327 is threaded into the threaded aperture 390, a bolt head 328 associated with the bolt 327 engages the pedestal portion 392. As the bolt 327 is tightened, the restraint apparatus 331 and the spare wheel 310 are thereby secured in a fixed position with respect to the mounting base 324.

Because the bolt head 328 may become recessed within a cavity formed by the pedestal portion 392 (e.g., as shown in FIG. 6), it may become difficult for an operator to use his or her fingers to turn the bolt head 328. For this reason, the bolt head 328 may be provided with knurls or other features to facilitate simpler engagement by an operator. Alternatively, the bolt head 328 might be configured to interact with one or more tools. For example, the bolt head 328 might be shaped like a lug nut so that the operator can use the lug nut wrench 358 to tighten or loosen the bolt 327. As another alternative, the bolt head 328 might include a slot or another such feature to facilitate interaction with a screwdriver or a pry bar.

After the restraint apparatus 331 is secured with respect to the spare wheel 310 as discussed above, tools or other implements (e.g., tools 356, 358, 360 and 362, and spacers 364 and 366) may be secured within a variably sized opening 384 provided by one or more strap members. In the specific embodiment shown in FIG. 6, the variably sized opening 384 is formed by the first and second strap members 342 and 344 when they are attached together with a connector 348 and a hook and loop fastener arrangement 350. However, it should be appreciated that other strap member configurations might alternatively provide the variably sized opening 384 in which tools or other implements can be retained.

The foregoing description of exemplary embodiments and examples of the invention has been presented for purposes of illustration and description. These examples and descriptions are not intended to be exhaustive or to limit the invention to the forms described. Numerous modifications are possible in light of the above teachings. Some of those modifications have been discussed, and others will be understood by those skilled in the art. It is hereby intended that the scope of the invention be defined by the claims appended hereto.

What is claimed is:

1. An apparatus for securing tools with respect to a spare wheel for a vehicle, the apparatus comprising:
    a hub member, the hub member being adapted for selective securement to a central area of a spare wheel, the hub member comprising a base portion and a pedestal portion extending away from the base portion, the pedestal portion comprising a distal wall and a side wall to separate the distal wall from the base portion, the base portion and the pedestal portion being configured to receive a fastener extending through both the base portion and the pedestal portion for selectively securing the hub member to a central area of a spare wheel;
    at least one securement structure on the base portion of the hub member, the at least one securement structure being spaced apart from the pedestal portion of the hub member; and
    at least one strap member secured to the at least one securement structure; wherein
    the at least one strap member is adjustable and cooperates with at least the pedestal portion of the hub member to define a variably sized opening; and
    the at least one strap member is configured to selectively secure at least one tool within the variably sized opening.

2. An apparatus as recited in claim 1 wherein the strap member is configured to adjust the size of the variably sized opening to compressingly engage at least one tool within the variably sized opening.

3. An apparatus as recited in claim 1 wherein the at least one securement structure includes first and second securement structures, the at least one strap member includes a first strap member having a first end and a second end, the first end being secured to the first securement structure, and the second end being configured for selective interconnection with the second securement structure.

4. An apparatus as recited in claim 1 wherein the at least one securement structure is integrally formed with the hub member.

5. An apparatus as recited in claim 1 wherein the at least one securement structure is directly on the hub member.

6. An apparatus as recited in claim 1 wherein the at least one securement structure includes first and second securement structures, the at least one strap member includes first and second strap members each having first and second ends, the first end of the first strap member being secured to the first securement structure, the first end of the second strap member being secured to the second securement structure, and the second end of the first strap member being configured for selective interconnection with the second end of the second strap member.

7. The apparatus as recited in claim 6 further comprising a connector for selectively interconnecting the second ends of the first and second strap members.

8. An apparatus as recited in claim 1 wherein the at least one strap member comprises at least one belt.

9. An apparatus as recited in claim 8 further comprising hook and loop fasteners attached to the at least one belt, wherein the hook and loop fasteners are configured to assist in facilitating securement by the belt of at least one tool within the variably sized opening.

10. An apparatus as recited in claim 1, wherein:
the base portion has a first aperture and the pedestal portion has a second aperture, the second aperture communicating with the first aperture for receiving a fastener through both the pedestal portion and the base portion for selectively securing the hub member to a central area of a spare wheel.

11. An apparatus as recited in claim 10, wherein:
the base portion is an annular portion.

12. An apparatus as recited in claim 11, wherein:
the pedestal portion has a hollow interior that communicates with the first aperture in the base portion and the second aperture in the pedestal portion, wherein the first aperture in the base portion operably communicates with an opening in a central area of a spare wheel.

13. In combination with a spare wheel for a vehicle, an apparatus for securing tools with respect to the spare wheel, comprising:
a hub member, the hub member being adapted for selective securement to a central area of the spare wheel, the hub member comprising a base portion and a pedestal portion extending away from the base portion, the pedestal portion comprising a distal wall and a side wall to separate the distal wall from the base portion, the base portion and the pedestal portion being configured to receive a fastener extending through both the base portion and the pedestal portion for selectively securing the hub member to a central area of a spare wheel;
at least one tool;
at least one securement structure on the base portion of the hub member, the at least one securement structure being spaced apart from the pedestal portion of the hub member; and
at least one strap member secured to the hub member wherein:
the at least one strap member is secured to the at least one securement structure; and
the at least one strap member is adjustable and cooperates with at least the pedestal portion of the hub member to define a variably sized opening, the at least one strap member being configured to selectively secure the at least one tool within the variably sized opening.

14. An apparatus as recited in claim 13 wherein the strap member is configured to adjust the size of the variably sized opening to compressingly engage the at least one tool within the variably sized opening.

15. An apparatus as recited in claim 13 wherein the at least one securement structure includes first and second securement structures, the at least one strap member includes a first strap member having a first end and a second end, the first end being secured to the first securement structure, and the second end being configured for selective interconnection with the second securement structure.

16. An apparatus as recited in claim 13 wherein the at least one tool comprises at least one of a jack, a lug nut wrench, a jack handle, and a pry bar.

17. An apparatus as recited in claim 13 wherein the at least one strap member comprises at least one belt.

18. An apparatus as recited in claim 17 further comprising hook and loop fasteners attached to the at least one belt, wherein the hook and loop fasteners are configured to assist in facilitating securement by the belt of the at least one tool within the variably sized opening.

19. An apparatus as recited in claim 13, wherein the at least one securement structure includes first and second securement structures, the at least one strap member includes first and second strap members each having first and second ends, the first end of the first strap member being secured to the first securement structure, the first end of the second strap member being secured to the second securement structure, and the second end of the first strap member being configured for selective interconnection with the second end of the second strap member.

20. An apparatus as recited in claim 19, wherein:
the first strap member comprises a first belt and the second strap member comprises a second belt.

21. The apparatus as recited in claim 20 further comprising at least one of a connector and a hook and loop fastener arrangement for selectively interconnecting respective ends of the first belt and the second belt.

22. An apparatus for securing tools with respect to a spare wheel for a vehicle, the apparatus comprising:
a hub member, the hub member being adapted for selective securement to a central area of a spare wheel, the hub member comprising a base portion and a pedestal portion extending away from the base portion, the pedestal portion comprising a distal wall and a side wall to separate the distal wall from the base portion, the base portion and the pedestal portion being configured to receive a fastener extending through both the base portion and the pedestal portion for selectively securing the hub member to a central area of a spare wheel;
at least one securement structure on the base portion of the hub member, the at least one securement structure being spaced apart from the pedestal portion of the hub member; and
at least one strap member secured to the at least one securement structure, the at least one strap member comprising first and second ends; wherein
the first end of the at least one strap member is partially wrapped around the securement structure;
the at least one strap member is adjustable to at least partially define a variably sized opening; and
the at least one strap member is configured to selectively secure at least one tool within the variably sized opening.

23. An apparatus as recited in claim 22, wherein the at least one strap member cooperates with at least the pedestal portion of the hub member to define the variably sized opening.

24. An apparatus as recited in claim 22, wherein the first end of the at least one strap member extends through the base portion of the hub member.

25. An apparatus as recited in claim 24, wherein the at least one strap member cooperates with at least the pedestal portion of the hub member to define the variably sized opening.

26. An apparatus as recited in claim 22, wherein:
the at least one securement structure comprises first and second securement structures, the at least one strap member comprises first and second strap members each having first and second ends, the first end of the first strap member being secured to the first securement structure, the first end of the second strap member being secured to the second securement structure, and the second end of the first strap member being configured for selective interconnection with the second end of the second strap member; and
the first end of the first strap member is partially wrapped around the first securement structure and the first end of the second strap member is partially wrapped around the second securement structure.

27. An apparatus as recited in claim 26, wherein the first strap member and the second strap member cooperate with at least the pedestal portion of the hub member to define the variably sized opening.

28. An apparatus as recited in claim 27, wherein:
the first end of the first strap member extends through the base portion of the hub member; and
the first end of the second strap member extends through the base portion of the hub member.

29. An apparatus as recited in claim 28, further comprising a connector for selectively interconnecting the second ends of the first and second strap members.

30. An apparatus as recited in claim 10, further comprising:
hook and loop fasteners attached to one of the first and second strap members, wherein the hook and loop fasteners are configured to assist in facilitating securement by the first and second strap members of at least one tool within the variably sized opening.

* * * * *

UNITED STATES PATENT AND TRADEMARK OFFICE
CERTIFICATE OF CORRECTION

PATENT NO. : 7,708,175 B2  Page 1 of 1
APPLICATION NO. : 10/894687
DATED : May 4, 2010
INVENTOR(S) : David Michael Edwards It is certified that error appears in the above-identified patent and that said Letters Patent is hereby corrected as shown below:

Claim 30, Column 12, line 15, change "claim 10" to "claim 29".

Signed and Sealed this

Seventeenth Day of August, 2010

David J. Kappos
*Director of the United States Patent and Trademark Office*